United States Patent
Rajaboina et al.

(10) Patent No.: US 12,468,460 B2
(45) Date of Patent: Nov. 11, 2025

(54) PROMOTING NVME PRIVATE NAMESPACE TO SHARED NAMESPACE

(71) Applicant: International Business Machines Corporation, Armonk, NY (US)

(72) Inventors: Yadagiri Rajaboina, Hyderabad (IN); Hanumanthu Hanok, Hyderabad (IN); Venkateshwar R. Yerravalli, Hyderabad (IN); Phani Kumar V.U. Ayyagari, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/612,379

(22) Filed: Mar. 21, 2024

(65) Prior Publication Data

US 2025/0298525 A1    Sep. 25, 2025

(51) Int. Cl.
*G06F 3/06* (2006.01)

(52) U.S. Cl.
CPC .......... *G06F 3/0634* (2013.01); *G06F 3/0604* (2013.01); *G06F 3/0679* (2013.01)

(58) Field of Classification Search
CPC ..... G06F 3/0634; G06F 3/0604; G06F 3/0679
See application file for complete search history.

(56) References Cited

U.S. PATENT DOCUMENTS

| | | | |
|---|---|---|---|
| 9,396,205 B1 | 7/2016 | Lewis et al. | |
| 10,558,376 B2 | 2/2020 | Hahn et al. | |
| 10,866,740 B2 | 12/2020 | Benisty et al. | |
| 11,036,533 B2 | 6/2021 | Pinto | |
| 2017/0024166 A1 | 1/2017 | Singh et al. | |
| 2020/0089619 A1* | 3/2020 | Hsu | G06F 3/0604 |
| 2020/0409559 A1* | 12/2020 | Sharon | G06F 3/064 |
| 2023/0044609 A1 | 2/2023 | Chang et al. | |
| 2023/0185766 A1 | 6/2023 | Jones et al. | |
| 2024/0129305 A1* | 4/2024 | Ye | G06F 12/109 |
| 2024/0361959 A1* | 10/2024 | Piao | G06F 3/067 |

FOREIGN PATENT DOCUMENTS

WO    2019229654 A1    12/2019

OTHER PUBLICATIONS

Authors et al., Intelligent I/O Management Based on Automated NVMe Power State Transition Notifications, ip.com, Dec. 7, 2023. https://www.ibm.com/docs/en/linux-on-systems?topic=servers, NVMe namespaces on NED24 NVMe expansion drawer, updated May 23, 2023.

* cited by examiner

*Primary Examiner* — Edward J Dudek, Jr.
(74) *Attorney, Agent, or Firm* — Patterson + Sheridan, LLP

(57) ABSTRACT

Disclosed embodiments provide systems, methods, and techniques enabling Non-Volatile Memory Express (NVMe) namespace promotion from a private namespace to a shared namespace, which eliminate conventional operations of deleting existing private namespaces and creating new namespaces as shared. In a disclosed embodiment, an NVMe host driver issues an NVMe management command to change an NVMe private namespace to a shared namespace during a namespace promotion. An NVMe controller sends an NVMe response to the NVMe host indicating an attribute of the NVMe private namespace changed to the shared namespace. The NVMe response is received by a host processor and the private namespace is promoted to shared and attachable by multiple NVMe controllers in an NVMe subsystem.

20 Claims, 7 Drawing Sheets

600

**NVMe NAMESPACE MANAGEMENT ADMIN COMMAND
"PROMOTE PRIVATE TO SHARED' COMMAND**

| Bits 602 | Description 604 |
|---|---|
| 31:04 | Reserved |

03:00   Select (SEL) – This field selects the type of management operation to perform

| Value 606 | Description 608 |
|---|---|
| 0h | Create |
| 1h | Delete |
| 2h | Promote private to shared |
| 3h to Fh | Reserved |

| Byte 622 | Value 624 |
|---|---|
| 19:16 | New NSID (NNSID): For a promote operation, contains a NSID value unique across the NVMe subsystem, for other operations it is reserved |

| Value 626 | Description 628 | Commands Affected 630 |
|---|---|---|
| 25h | NSID Changed | IO Command involving NSID (e.g., Read, Write, Compare, Write Zeros, etc. |

FIG. 6B

PROMOTING NVME PRIVATE NAMESPACE TO SHARED NAMESPACE

BACKGROUND

The present invention relates to data processing systems, and more specifically, to methods, systems, and computer program products for implementing enhanced promotion of Non-Volatile Memory Express (NVMe) private namespaces to shared namespaces.

NVMe is used with PCI Express (PCIe) to connect Solid-State Device (SSD) data storage to servers or central processing units (CPUs) to enable high speed and effective performance. NVMe namespaces are a collection of logical blocks addressable by host software. Traditional NVMe controllers can provide single namespaces or multiple namespaces, which are presented as a separate target device to the host software. An NVMe namespace is visible only if it is attached to an NVMe controller. Namespaces have attributes such as size, capacity, utilization, namespace identifier and access type, which is either shared or private. Namespaces can be created as shared to support multipath IO and can be attached to two or more controllers in an NVMe subsystem. While NVMe computing systems can enable enhanced computing performance, technical challenges remain. For example, existing private namespaces in NVMe SSDs can only be attached to one controller at a time. A need exists for new systems and techniques for both efficiently and effectively promoting NVMe private namespaces to shared namespaces attachable by multiple NVMe controllers in an NVMe subsystem, without deleting the existing private namespaces and creating the new shared namespaces.

SUMMARY

Embodiments of the present disclosure are directed to methods, systems, and computer program products for implementing enhanced promotion of existing Non-Volatile Memory Express (NVMe) private namespaces to shared namespaces.

According to one embodiment of the present disclosure, a non-limiting computer implemented method is provided. The method comprises issuing a defined Non-Volatile Memory Express (NVMe) management command to change an NVMe private namespace to a shared namespace during namespace promotion; receiving an NVMe response indicating an attribute of the NVMe private namespace changed to shared; and promoting the private namespace to shared and attachable by multiple NVMe controllers in an NVMe subsystem.

Another disclosed method further comprises receiving an asynchronous event notification, based on an update of a starting NVMe Namespace Identifier (NSID) to a new NSID for the shared namespace; and issuing, based on inflight aborted Input/Outputs (IOs) having the starting NVMe NSID, the aborted IOs with the new NSID.

Other disclosed embodiments include a computer system and a computer program product for promoting NVMe private namespaces to shared namespaces, implementing features of the above-disclosed methods.

BRIEF DESCRIPTION OF THE DRAWINGS

FIGS. 6A and 6B are charts respectively illustrating an example embodiments of a defined Non-Volatile Memory Express (NVMe) management command to change an NVMe private namespace to shared, and an example asynchronous event notification, based on an update of a starting NVMe Namespace Identifier (NSID) to a new NSID.

DETAILED DESCRIPTION

Figure 1:
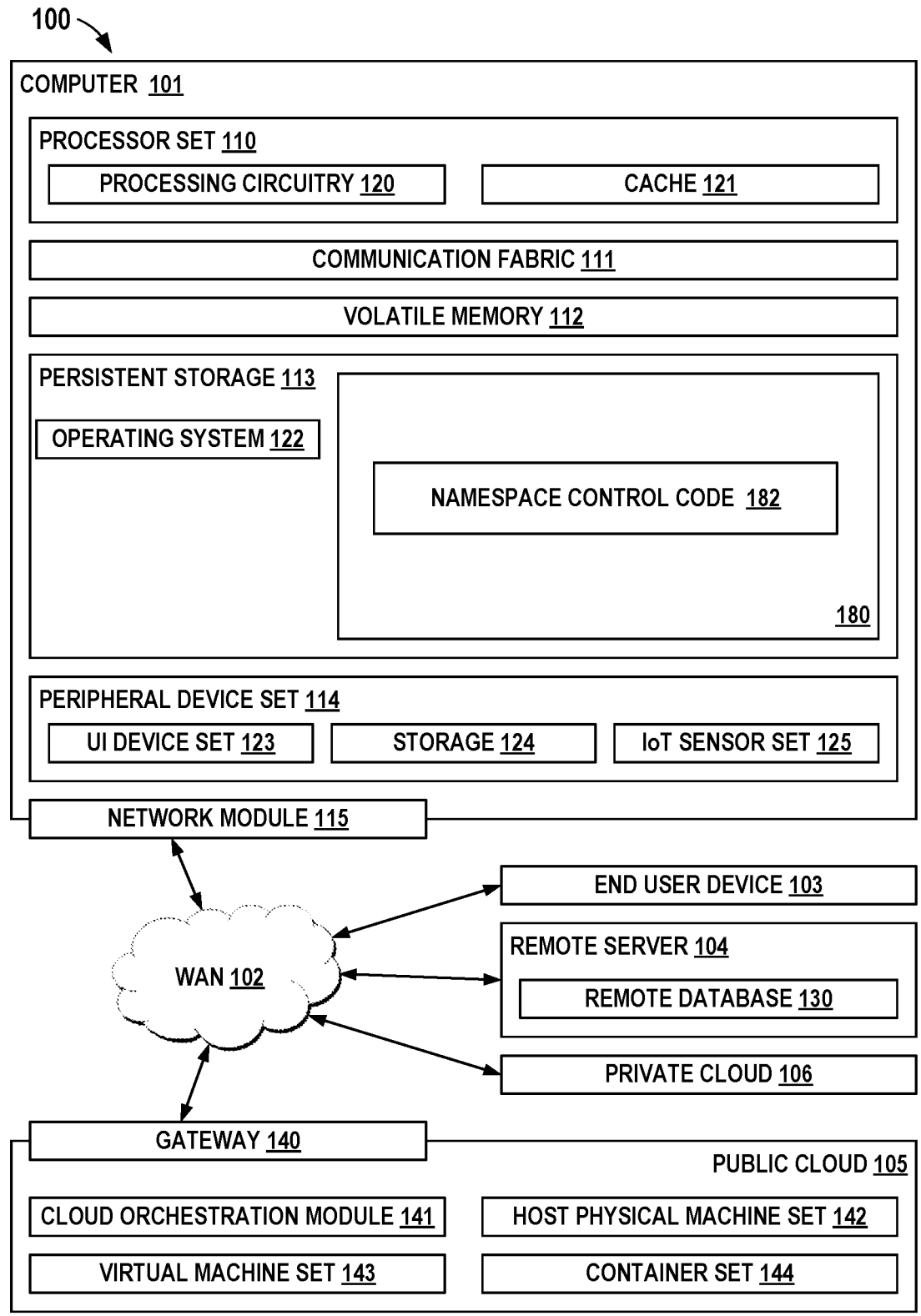
FIG. 1 is a block diagram of an example computer environment for use in conjunction with one or more disclosed embodiments.

Embodiments herein describe techniques for promoting NVMe private namespaces to shared namespaces in a computer system, for example using a collection of at least one of computer software, hardware, or firmware. Embodiments of the present disclosure describe techniques to promote existing private namespaces in multi-port capable controllers of an NVMe subsystem, to shared and attachable by multiple capable controllers in the same NVMe subsystem, without losing or duplicating existing data. Existing private namespaces lack multi-path capability, creating new shared namespaces is required to enable multi-path capability, which typically requires deleting the existing private namespaces and creating the new shared namespaces and the user is required to backup namespace data or lose the data. Disclosed embodiments provide methods to promote NVMe private namespaces to shared namespaces without losing or duplicating the data using a 'Promote private to shared namespace' command.

Disclosed embodiments provide systems, methods, and techniques enabling namespace promotion from a private namespace to a shared namespace, which eliminate the need of conventional arrangements for deleting existing private namespaces and creating a new shared namespace. One disclosed embodiment includes an NVMe host driver issuing a Promote private to shared namespace management command for promoting NVMe private namespaces to shared namespaces, receiving an NVMe response indicating an attribute of the private namespace changed to shared namespace and promoting the private namespace to shared and attachable by multiple NVMe controllers in an NVMe subsystem. When an existing namespace identifier (NSID) for the private namespace is unique across an NVMe subsystem, the existing NSID advantageously is used for the promoted shared namespace, where creating a new NSID is not required. In a disclosed embodiment, a new NSID is created for the shared namespace by the NVMe controller when the starting NSID is not unique, for example the starting NSID has been used by another controller in the NVMe subsystem. Another disclosed embodiment further includes the NVMe host driver receiving an asynchronous event notification from a NVMe controller indicating a starting NSID has changed to a new NSID, and reissuing aborted inflight Input/Outputs (IOs) having the starting NSID with the new NSID to avoid data loss, and issuing subsequent IOs requests with the new NSID.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, a computing environment 100 contains an example of an environment for the execution of at least some of the computer code involved in performing the inventive methods, such as a Namespace Control Code 182, at block 180. In addition to block 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
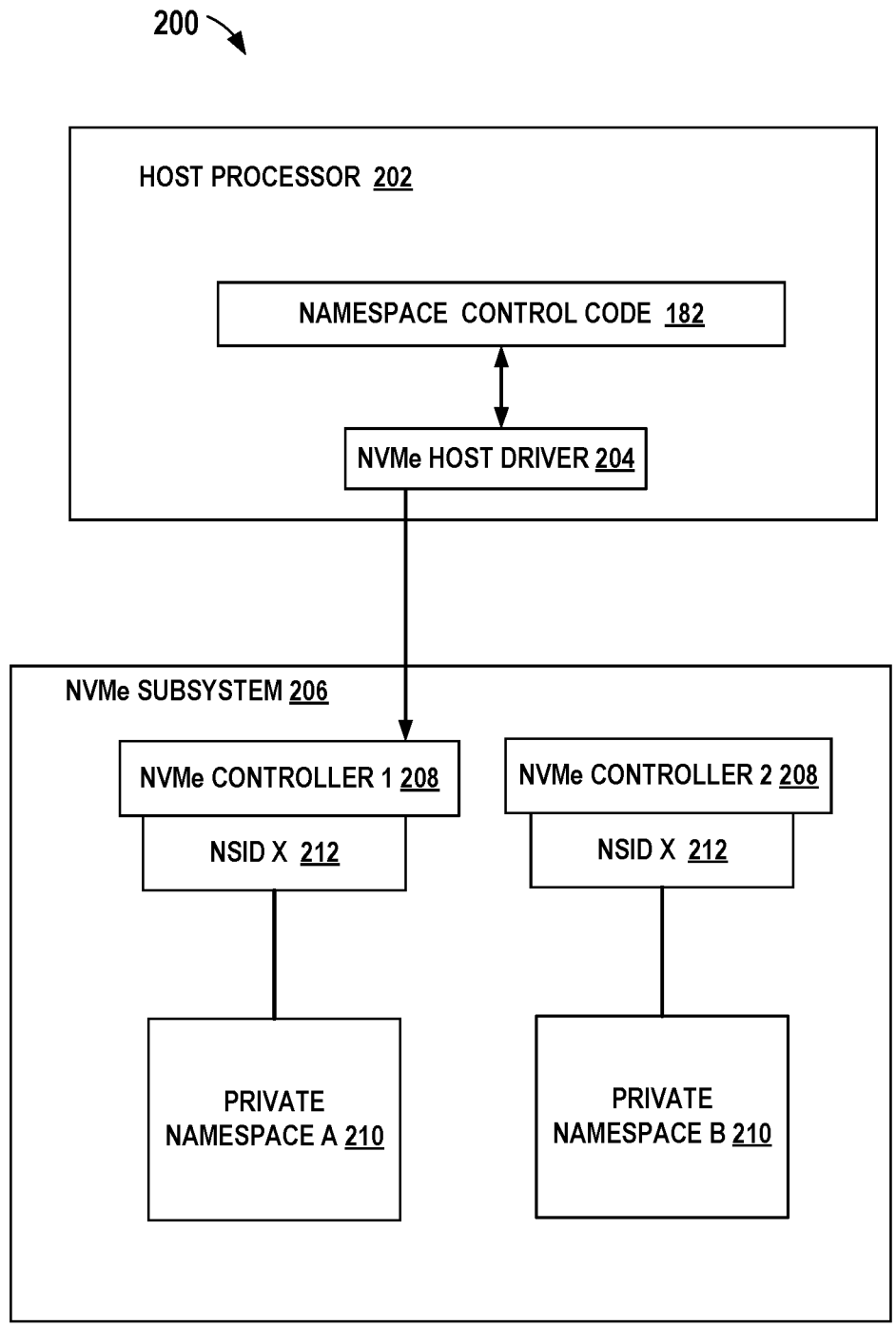
FIG. 2 is a block diagram of an example system for promoting NVMe private namespaces to shared namespaces of one or more disclosed embodiments.

FIG. 2 illustrates an example system 200 for implementing namespace promotion of one or more embodiments of the present disclosure. System 200 can be used in conjunction with the Namespace Control Code 182, the computer 101 and cloud environment of the computing environment 100 of FIG. 1 of disclosed embodiments. The features described with respect to system 200 may be used in conjunction with other embodiments described herein. System 200 may represent one example implementation of the computer 101 in FIG. 1. In some embodiments, the system 200 may be implemented with a server computer or a mainframe computer.

System 200 includes a host server or host 202 including an NVMe host driver 204 of disclosed embodiments. Host server 202 uses NVMe with PCI Express (PCIe) to connect to a storage subsystem 206 of Solid-State Device (SSD) data storage, enabling high speed and effective performance of disclosed embodiments.

In an embodiment, host server 202 is communicatively coupled via communication links 205 to a non-volatile memory (NVM) storage subsystem 206, of a solid-state drive SSD with multiple PCI functions. System 200 and host server 202 are operable for promoting NVMe private namespaces to shared namespaces without losing or duplicating data of one or more disclosed embodiments. The communication links 205 can be implemented using a plurality of conductors in any suitable form (e.g., conductive traces or wires). In an embodiment, the communication links 205 comprise PCIe communication links; for example, comprising an 8-lane PCIe connection, where each of the lanes comprises a respective two conductors.

In an embodiment, the NVM storage subsystem 206 includes one or multiple (two shown) independent NVMe controllers 208 1, 2. As shown, the NVM storage subsystem 206 includes a private namespace A 210, associated with the NVMe controllers 208 1, and a private namespace B 210 associated with the NVMe controllers 208 1 with a respective NSID x 212 of disclosed embodiments.

Figure 3:
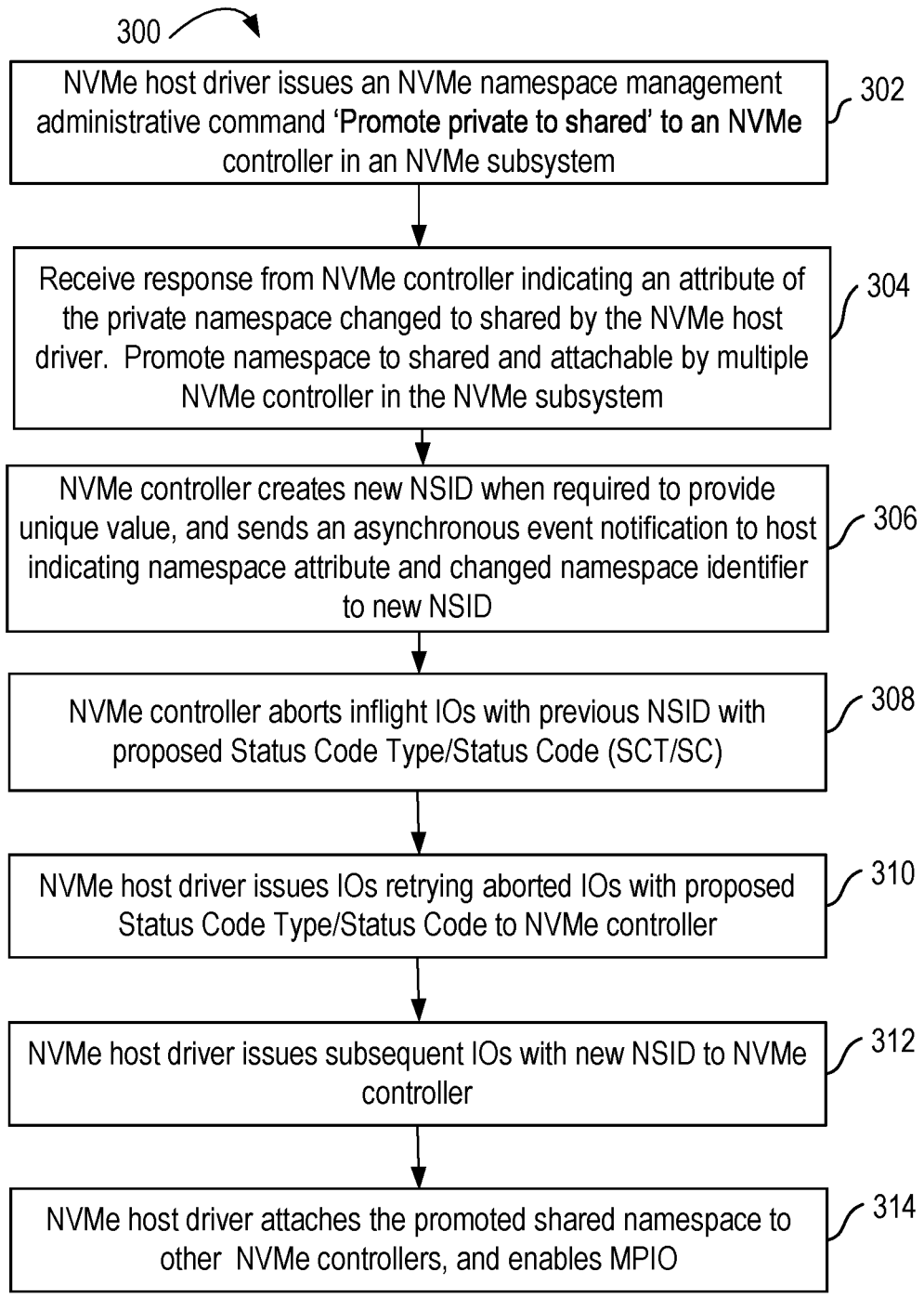
FIG. 3 is a flow chart of example operations of a method for promoting NVMe private namespaces to shared namespaces of one or more disclosed embodiments.

In an embodiment, the NVMe host driver 204 issues a defined Non-Volatile Memory Express (NVMe) management command to promote or change NVMe private namespaces to shared namespaces, during a namespace promotion. The new NVMe command introduces a new namespace management operation command code, "Promote private to shared," for use with existing NVMe namespace management Admin commands a FIG. 3 illustrate example operations of a method 300 for promoting NVMe private namespaces to shared namespaces of one or more disclosed embodiments. Method 300 can be implemented by system 200 in conjunction with the Namespace Control Code 182, the computer 101 and cloud environment of the computing environment 100 of FIG. 1 of disclosed embodiments.

At block 302, system 200 issues, using the NVMe host driver 204 the new namespace management operation command code: "Promote private to shared" to the NVMe controller 1 208. In an embodiment, the NVMe host driver 204, issues the new NVMe namespace management Admin command for namespace promotion of disclosed embodiment, such as shown in FIG. 6A, which illustrates a NVMe namespace management Admin command 600 to Promote private to shared. In an embodiment, the NVMe host driver 204 issues the new NVMe namespace management Admin command with DWORD10 illustrated in FIG. 6A.

Figure 4A:
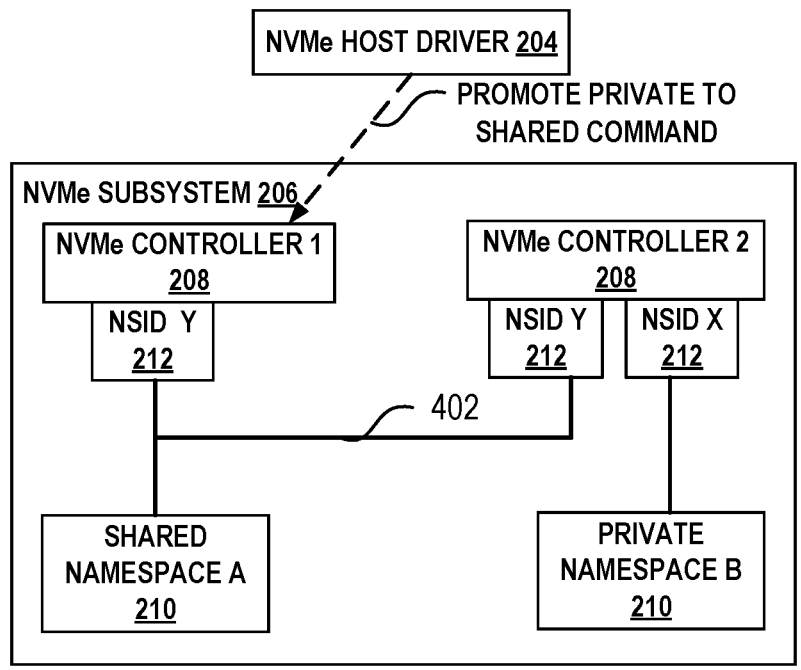
FIGS. 4A and 4B are respective schematic and block diagrams illustrating example operations of a NVMe host driver and NVMe controllers of a namespace promotion for promoting NVMe private namespaces to shared namespaces of one or more disclosed embodiments.
Figure 4B:
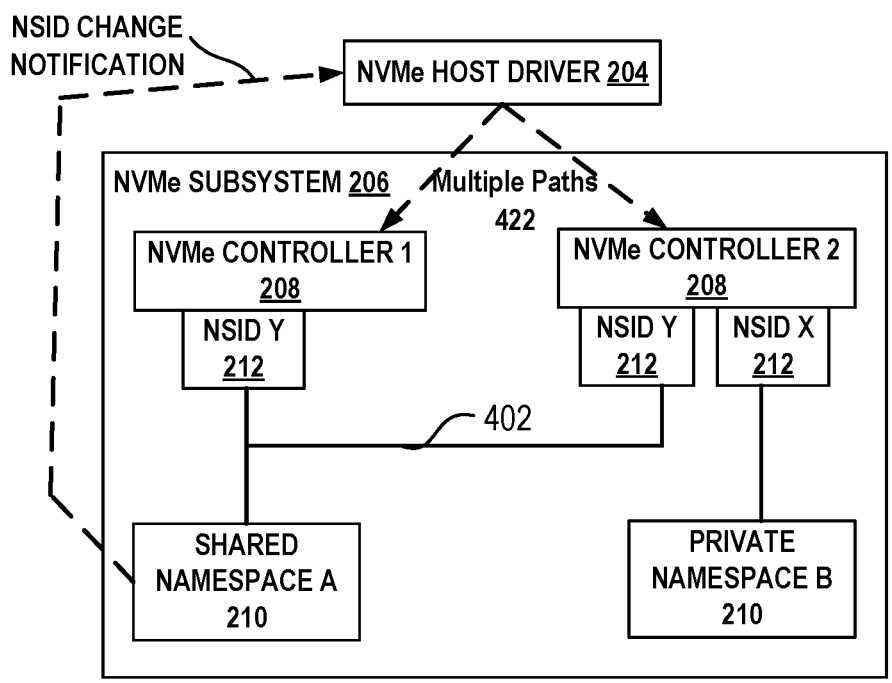

In an embodiment, the NVMe host driver 204 and the NVMe controllers 1, 2 208 use the NSID to access NVMe namespaces, such as the NSID X 212 to access private NVMe namespace A 210, as shown in FIG. 2. Shared namespaces have a unique NSID at the NVMe subsystem level 206, such as the NSID Y 212 to access the shared NVMe namespace A 210, as shown in FIGS. 4A, and 4B. Promoting the private namespace A 210 that has a given NSID X 212, which may be in use in other controllers, such as NVMe controllers 1, 2 208, within the NVMe subsystem 206 requires a new unique NSID to be created by NVMe subsystem.

At block 304, NVMe host driver 204 of system 200 receives a response from NVMe controller 1 208, indicating an attribute of the NVMe private namespace changed to the shared namespace of successful promotion of the private namespaces to shared namespaces. Based on the response, the host driver 204 promotes the private namespace to shared and attachable by multiple NVMe controllers 208 in the NVMe subsystem 206. In an embodiment, a new Change Namespace Event (Event Type 06) of disclosed embodiments includes changes of an existing Change Namespace Event, for example as shown in an illustrative response command embodiments 620 illustrated and described with respect to FIG. 6B. An existing starting NSID for the private namespace is used without change for the promoted shared namespace when the starting NSID is unique across an NVMe subsystem. The starting NSID is unique, for example, the starting NSID is currently used with the private namespace and has not been used in any other controllers in the NVMe subsystem 206.

Operations continue using the unique starting NSID for the shared namespace following the promotion of the private namespace to shared and attachable by multiple NVMe controllers 208 in the NVMe subsystem 206 at block 304. In a disclosed embodiment, a new NSID is created for the shared namespace by the NVMe controller 1 208 when the starting NSID has been used by another controller 208 in the NVMe subsystem 206, i.e., the starting NSID is not unique.

At block 306, NVMe controller 1 208 sends an asynchronous event notification to the host processor 202 indicating that the namespace identifier (NSID) has changed to a new NSID via the NVMe host driver 204. The NVMe controller 1 208 changes the starting NSID to a unique value for a new NSID upon detecting an NSID conflict among sibling controllers 208 and generates an event notification with the new NSID change. Upon successfully promoting the private namespace to shared, the NVMe controller 1 208 updates the shared namespace A 210 with a new NSID Y 212 (when required) across the NVMe subsystem 106 and returns the new NSID to the NVMe host driver 204, for example in a Completion Queue Entry (CQE) DWORD0 of the NVMe response command of FIG. 6B.

At block 308, NVMe controller 1 208 aborts the inflight IOs with the previous NSID (e.g., starting NSID X 212) with a Status Code Type/Status Code (SCT/SC), such as Status Code Type (SCT) 0h and proposed Status Code (SC) value 25h. NVMe controller 1 208 generates a failed notice to send to the NVMe host driver 204 identifying the aborted inflight IOs with the starting NSID, to enable retry operations by the NVMe host driver. At block 310, NVMe host driver 204 issues the aborted IOs to retry the aborted IOs with the proposed SCT/SC. At block 312, NVMe host driver 204 issues subsequent IOs requests with the new NSID of the shared namespaces. For example upon receiving the new NSID via the asynchronous event notification, NVMe host driver 204 issues subsequent IOs requests with the new NSID. At block 314, NVMe host driver 204 attaches the promoted shared namespace from other controllers when needed, and enables multipath IO (MPIO) for NVMe controllers 1, 2 208. The MPIO provides fault-tolerance and performance-enhancement techniques that defines more than one physical path between the NVMe host driver 204 and the NVMe controllers 1, 2 208.

Figure 5:
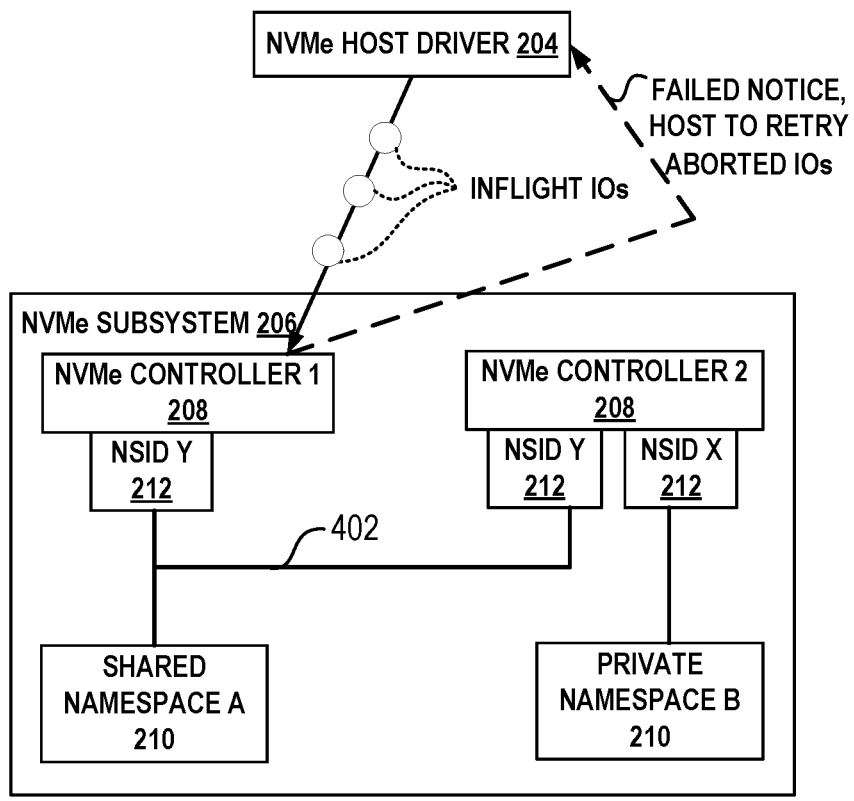
FIG. 5 is a schematic and block diagram together illustrating example I/O retry operations of a NVMe host driver and NVMe controllers of one or more disclosed embodiments.

FIGS. 4A and 4B illustrates example operations of the NVMe host driver 204 and NVMe controllers 208 1, 2 of promoting NVMe private namespaces to shared namespaces of one or more disclosed embodiments. In FIGS. 4, and 5, the same reference numbers are used for identical or similar components as used in FIG. 2.

In FIG. 4A, the NVMe host driver 204, issues the new NVMe namespace management Admin command for namespace promotion to the NVMe controller 208 1, indicated at dotted line PROMOTE PRIVATE TO SHARED COMMAND, such as shown at block 302 in FIG. 3. The NVMe controller 1 208 promotes a connection 402 to the NVMe controller 2 208, updates a starting NSID X 212 (e.g., shown in FIG. 2 with a starting private namespace A 210) to a unique value NSID Y 212 after the promotion to shared namespace A 210 and generates a namespace ID change notification.

In FIG. 4B, the NVMe controllers 1 208 sends the namespace ID change notification for the shared namespace A 212, indicated at dotted line NSID CHANGE NOTIFICATION. As shown, after the promotion to shared namespace A 210 multiple paths 422 are established, as indicated by dotted lines Multiple Paths 422, between the NVMe host driver 204 and the NVMe controllers 1, 2 208.

FIG. 5 is a schematic and block diagram together illustrating example I/O retry operations of the NVMe host driver 204 and NVMe controllers 1, 2 208 of one or more disclosed embodiments. In FIG. 5, NVMe controller 1 208 aborts all inflight IOs with the previous NSID (e.g., starting NSID X 212 of private namespace A 210 of FIG. 2), indicated at line INFLIGHT IOs. The NVMe host driver 204 receives a failed notice with a Status Code Type/Status Code (SCT/SC), indicated at dotted line FAILED NOTICE, HOST TO RETRY ABORTED IOs. The NVMe host driver 204 reissues IOs to retry aborted IOs with the new NSID Y 212 of the shared namespace A 210.

FIG. 6A illustrates an example defined Non-Volatile Memory Express (NVMe) management command 600 to promote a change of an NVMe private namespace to shared. The NVMe management command 600 includes bits 602 and Description 604 including values 606 and description 608 including value 2h with Description 'Promote private to shared', in accordance with a disclosed embodiment. In an embodiment, the NVMe host driver 204 issues the NVMe management command 600 to promote the NVMe private namespace A 210 to shared private namespace A 210, as described at block 302 in FIG. 3, and illustrated in FIG. 4A.

FIG. 6B illustrates an example asynchronous event notification 620, based on an update of a starting NVMe Namespace Identifier (NSID) to a new NSID for the shared namespace, when required to provide a unique NSID for the shared namespace. As described above, the NVMe controller 1 208 updates the namespace A 210 to shared with a shared NSID Y 212. The NVMe controller 1 208 updates the shared namespace A 210 across the NVMe subsystem 206 and returns the update to the NVMe host driver 204, for example in a Completion Queue Entry (CQE) DWORD0 of the NVMe Admin command 600. As shown, the asynchronous event notification 620 includes byte 622 and Value 624 including byte 19:16 with Value 624 of 'New NSID (NNID), where for the promote operation, the value contains an NSID value unique across the NVMe subsystem, for other operations it is reserved.' As shown one notification includes one Value 626 of 25h, Description 628 of NSID Changed, and Commands Affected 630 of IO 'Command involving NSID', for example, Read, Write, Compare, Write Zeroes, and the like. In an embodiment, the NVMe host driver 204 upon receiving the new NSID via the asynchronous event notification from the controller 1 208, issues subsequent I/O requests with the new NSID.

Figure 7:
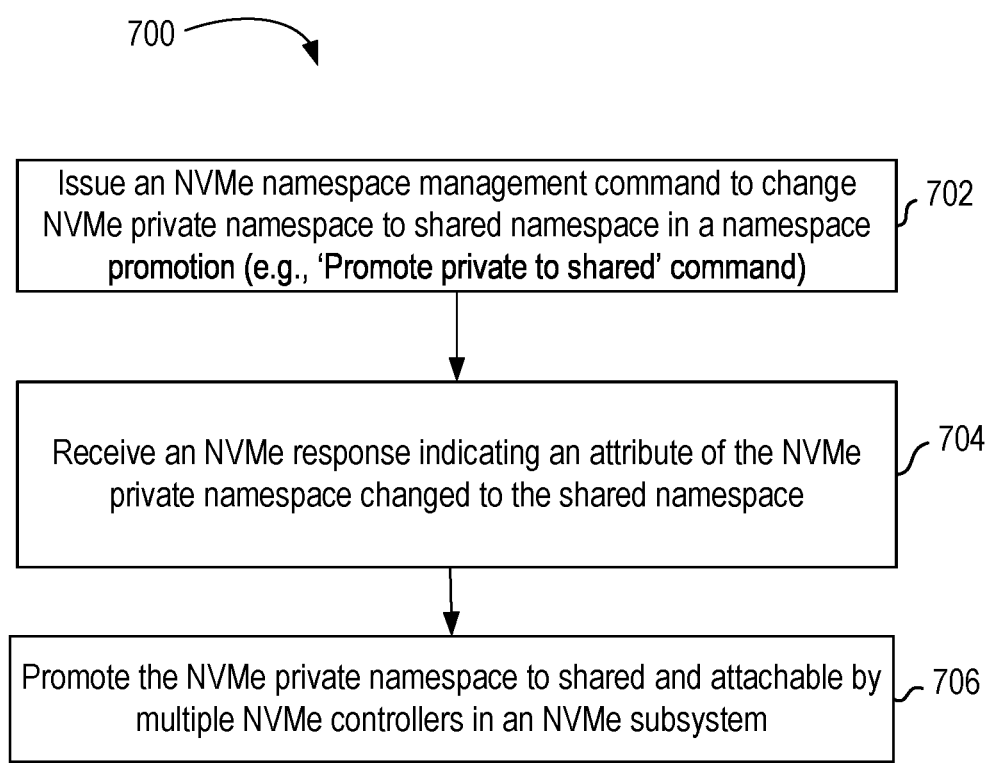
FIG. 7 is a flow chart illustrating example features and operations of a method for promoting NVMe private namespaces to shared namespaces of one or more disclosed embodiments.

FIG. 7 illustrating example features and operations of a method 700 for promoting NVMe private namespaces to shared namespaces of one or more disclosed embodiments. Method 700 can be implemented by system 200, (e.g., using the host driver 204), in conjunction with the Namespace Control Code 182, the computer 101 and cloud environment of the computing environment 100 of FIG. 1 of disclosed embodiments.

At block 702, a defined Non-Volatile Memory Express (NVMe) management command is issued to change an NVMe private namespace to a shared namespace, during a namespace promotion. For example, the NVMe management command can be implemented with the NVMe namespace management Admin command 600 to Promote private to shared illustrated in FIG. 6A. At block 704, an NVMe response is received indicating an attribute of the NVMe private namespace changed to the shared namespace. At block 706, the private namespace is promoted to shared and attachable by multiple NVMe controllers in an NVMe subsystem. For example, the NVMe host driver 204 receives the NVMe response and the private namespace is promoted to shared and attachable by multiple NVMe controllers 208 in an NVMe subsystem 206.

While the foregoing is directed to embodiments of the present invention, other and further embodiments of the invention may be devised without departing from the basic scope thereof, and the scope thereof is determined by the claims that follow.

What is claimed is:

1. A method comprising:
    issuing a defined Non-Volatile Memory Express (NVMe) management command to change an NVMe private namespace to a shared namespace during a namespace promotion;
    receiving an NVMe response indicating an attribute of the NVMe private namespace changed to the shared namespace; and
    promoting the private namespace to shared and attachable by multiple NVMe controllers in an NVMe subsystem, wherein the promoting the private namespace comprises, based on the NVMe response indicating an NVMe Namespace Identifier (NSID) for the private namespace is unique across the NVMe subsystem, using the NSID for the promoted shared namespace in the multiple NVMe controllers.

2. The method of claim 1, further comprising:
    receiving an asynchronous event notification, based on an update of a starting NSID with a new NSID for the shared namespace; and updating the shared namespace with the new NSID.

3. The method of claim 2, wherein receiving the asynchronous event notification further comprises receiving a failed notification with inflight aborted Input/Outputs (IOs) having the starting NVMe NSID, and issuing the aborted IOs with the new NSID for the shared namespace.

4. The method of claim 2, further comprising:
    issuing subsequent IOs requests with the new NSID for the shared namespace based on the asynchronous event notification.

5. The method of claim 1, wherein issuing the defined NVMe management command further comprises an NVMe host driver issuing the defined NVMe management command to an NVMe controller of the NVMe subsystem.

6. The method of claim 5, further comprises the NVMe controller promoting the private NVMe namespace to the shared namespace, and generating and sending the NVMe response indicating the attribute of the NVMe private namespace changed to the shared namespace.

7. The method of claim 5, further comprises the NVMe controller creating a new NSID for the shared namespace based on identifying a starting NSID is in use by another NVMe controller in the NVMe subsystem; and the NVMe controller generating an asynchronous event notification with the new NSID and sending the asynchronous event notification to the NVMe host driver.

8. The method of claim 7, further comprises the NVMe controller receiving and aborting inflight IOs with the starting NSID for the shared namespace; and sending a failed notice to the NVMe host driver identifying the aborted inflight IOs.

9. The method of claim 8, further comprises the NVMe host driver reissuing the aborted inflight IOs with the new NSID for the shared namespace to the NVMe controller.

10. The method of claim 1, further comprises:
    issuing IOs requests to the shared namespace by an NVMe host driver, using one or more NVMe controllers of the multiple NVMe controllers in the NVMe subsystem.

11. A system, comprising one or more computer processors; and a memory containing a program which when executed by the one or more computer processors performs an operation, the operation comprising:
    issuing a defined Non-Volatile Memory Express (NVMe) management command to change an NVMe private namespace to a shared namespace during a namespace promotion;
    receiving an NVMe response indicating an attribute of the NVMe private namespace changed to the shared namespace; and
    promoting the private namespace to shared and attachable by multiple NVMe controllers in an NVMe subsystem, wherein the promoting the private comprises, based on the NVMe response indicating an NVMe Namespace Identifier (NSID) for the private namespace is unique across the NVMe subsystem, using the NSID for the promoted shared namespace in the multiple NVMe controllers.

12. The system of claim 11, further comprising:
    receiving an asynchronous event notification, based on an update of a starting NSID with a new NSID for the shared namespace; and updating the shared namespace with the new NSID.

13. The system of claim 12, wherein receiving the asynchronous event notification further comprises receiving a failed notification identifying inflight aborted Input/Outputs (IOs) having the starting NVMe NSID, and issuing the aborted IOs with the new NSID for the shared namespace.

14. The system of claim 12, further comprising:
    issuing subsequent IOs with the new NSID for the shared namespace based on the asynchronous event notification.

15. The system of claim 11, further comprises:
issuing IOs requests to the shared namespace by an NVMe host driver, using one or more NVMe controllers of the multiple NVMe controllers in the NVMe subsystem.

16. A computer program product comprising a computer-readable storage medium having computer-readable program code embodied therewith, the computer-readable program code executable by one or more computer processors to perform an operation comprising:
issuing a defined Non-Volatile Memory Express (NVMe) management command to change an NVMe private namespace to a shared namespace during a namespace promotion;
receiving an NVMe response indicating an attribute of the NVMe private namespace changed to the shared namespace; and
promoting the private namespace to shared and attachable by multiple NVMe controllers in an NVMe subsystem, wherein promoting the private namespace comprises, based on the NVMe response indicating an NVMe Namespace Identifier (NSID) for the private namespace is unique across the NVMe subsystem, using the NSID for the promoted shared namespace in the multiple NVMe controllers.

17. The computer program product of claim 16, further comprising:
receiving an asynchronous event notification, based on an update of a starting NSID with a new NSID for the shared namespace; and updating the shared namespace with the new NSID.

18. The computer program product of claim 17, wherein receiving the asynchronous event notification further comprises receiving a failed notification with inflight aborted Input/Outputs (IOs) having the starting NVMe NSID, and issuing the aborted IOs with the new NSID for the shared namespace.

19. The computer program product of claim 17, further comprising:
issuing subsequent IOs with the new NSID for the shared namespace based on the asynchronous event notification.

20. The computer program product of claim 16, further comprises:
issuing IOs requests to the shared namespace by an NVMe host driver, using one or more NVMe controllers of the multiple NVMe controllers in the NVMe subsystem.

* * * * *